(12) United States Patent
Van De Sluis et al.

(10) Patent No.: US 8,374,880 B2
(45) Date of Patent: Feb. 12, 2013

(54) SYSTEM FOR AUTOMATICALLY CREATING A LIGHTING ATMOSPHERE BASED ON A KEYWORD INPUT

(75) Inventors: Bartel Marinus Van De Sluis, Eindhoven (NL); Elmo Marcus Attila Diederiks, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 574 days.

(21) Appl. No.: 12/596,485

(22) PCT Filed: Apr. 21, 2008

(86) PCT No.: PCT/IB2008/051521
§ 371 (c)(1),
(2), (4) Date: Oct. 19, 2009

(87) PCT Pub. No.: WO2008/129505
PCT Pub. Date: Oct. 30, 2008

(65) Prior Publication Data
US 2011/0022396 A1 Jan. 27, 2011

(30) Foreign Application Priority Data
Apr. 24, 2007 (EP) .................................. 07106849

(51) Int. Cl.
*G10L 15/04* (2006.01)
(52) U.S. Cl. ...................................................... 704/275
(58) Field of Classification Search .......... 704/251–257, 704/270, 275
See application file for complete search history.

(56) References Cited

U.S. PATENT DOCUMENTS

| 5,680,511 | A  | * | 10/1997 | Baker et al. | 704/257 |
| 6,434,524 | B1 | * | 8/2002  | Weber        | 704/257 |
| 6,611,297 | B1 |   | 8/2003  | Akashi et al. | |
| 7,031,920 | B2 |   | 4/2006  | Dowling et al. | |
| 7,076,431 | B2 | * | 7/2006  | Kurganov et al. | 704/275 |
| 2006/0062424 | A1 | | 3/2006 | Diederiks et al. | |

FOREIGN PATENT DOCUMENTS

| FR | 2852173 A1 | 9/2004 |
| GB | 2354602 A | 3/2001 |
| JP | 2006058996 A | 3/2006 |
| WO | 0199475 A1 | 12/2001 |
| WO | 0210702 A2 | 2/2002 |
| WO | 03098971 A1 | 11/2003 |
| WO | 2005069639 A1 | 7/2005 |
| WO | 2006046190 A2 | 5/2006 |

* cited by examiner

*Primary Examiner* — Abul Azad
(74) *Attorney, Agent, or Firm* — Mark L. Beloborodov

(57) ABSTRACT

The invention relates to the automatic creation of an atmosphere, particularly a lighting atmosphere, based on a keyword input such as a keyword typed or spoken by a user. A basic idea of the invention is to enable a user of an atmosphere creation system such as a lighting system to automatically create a specific atmosphere by simply using a keyword which is input to the system. The keyword, for example "eat", "read", "relax", "sunny", "cool", "party", "Christmas", "beach", may be spoken or typed by the user and may enable the user to find and explore numerous atmospheres in an interactive and playful way in embodiments of the invention. Finding atmosphere elements related to the keyword may be done in various ways according to embodiments of the invention. The invention allows also a non expert in designing or creating atmosphere scenes to control the creation of a desired atmosphere in an atmosphere creation system.

7 Claims, 4 Drawing Sheets

SYSTEM FOR AUTOMATICALLY CREATING A LIGHTING ATMOSPHERE BASED ON A KEYWORD INPUT

The invention relates to the automatic creation of an atmosphere, particularly a lighting atmosphere, based on a keyword input such as a keyword typed or spoken by a user.

Lighting systems are becoming more advanced, flexible and integrated, and will enable new forms of lighting including color lighting and dynamics, which will make it possible to create a whole variety of numerous atmospheres with a single lighting system. Furthermore, besides lighting, atmosphere creation systems may also include the generation of smells and the rendering of atmospheric audio-visual content. This holds especially for professional domains like the retail domain, but new lighting systems or more generally atmosphere creation systems will also enter the home domain. This change is stimulated in case of lighting by the advent of LED lighting (or Solid State lighting—SSL). This new type of light makes the use of colored light easy. Colored light may be particularly used to create nice ambiences, for example in shops but also at home.

One problem of these complex new atmosphere creation systems, particularly lighting systems, is the control of the atmosphere creation which will become more complex due to the numerous features of these systems, for example the control of the color or the beam width of an ambience light created with a modern lighting system. Therefore, high quality atmosphere scenes are defined by experts like lighting designers and "scenographic architects". Moreover, customized settings of the atmosphere creation often require the assistance of such experts. It would be desirable to enable non-experts to control the atmosphere creation in a modern atmosphere creation system such as a complex lighting system. U.S. Pat. No. 7,031,920 B2 discloses a system and method for the control of color-based lighting through voice control or speech recognition as well as syntax for use with such a system.

It is an object of the invention to provide an automatic creation of an atmosphere, particularly a lighting atmosphere, in an atmosphere creation system such as a lighting system.

The object is achieved by the independent claim(s). Further embodiments are shown by the dependent claim(s).

A basic idea of the invention is to enable a user of an atmosphere creation system such as a lighting system to automatically create a specific atmosphere by simply using a keyword which is input to the system. The keyword, for example "eat", "read", "relax", "sunny", "cool", "party", "Christmas", "beach", may be spoken or typed by the user and may enable the user to find and explore numerous atmospheres in an interactive and playful way in embodiments of the invention. Finding atmosphere elements related to the keyword may be done in various ways according to embodiments of the invention. Examples are searching a (predefined) knowledge base that maps the keyword to certain atmosphere properties, searching for images and finding atmosphere properties in these images, or using a semantic web technology which enables a web crawler to find relations between a particular keyword and particular colors, for example "forest-green", "sea-blue", "party-colorful". The invention allows also a non expert in designing or creating atmosphere scenes to control the creation of a desired atmosphere in an atmosphere creation system. It should be noted that the invention may be applied to any kind of atmosphere creation system, which may generate sensorial perceptible stimuli such as the color and intensity of an ambient light, an ambient temperature, various scents, sounds and images.

According to an embodiment of the invention, a system for automatically creating an atmosphere with an atmosphere creation system is provided, wherein the system comprises the following characteristic features:
- keyword input receiving means adapted to transform a received keyword into a digital signal representing the received keyword,
- a keyword interpreter adapted to translate the digital signal into a computer process able keyword representation,
- an atmosphere elements finder adapted to find atmosphere elements related to the computer process able keyword representation by automatically processing the computer process able keyword representation, and
- an atmosphere creation means controller adapted to generate a control signal for the atmosphere creation system which adjusts settings of the atmosphere creation system depending on the found atmosphere elements.

This system allows a non expert to control the creation of a specific atmosphere by simply using a keyword instead of adjusting certain technical parameters of the atmosphere creation system, for example the intensity and color of certain lighting units of a lighting system.

In an embodiment of the invention, the keyword input receiving means may comprise a keyboard and a microphone for the entry of a keyword and an analog-to-digital converter for generating the digital signal from a microphone signal.

According to a further embodiment of the invention, the keyword interpreter may be adapted to check and correct the spelling of a keyword inputted via the keyboard and represented by the digital signal and may comprise an automatic speech recognition module for translating a spoken keyword received via the microphone and represented by the digital signal into the computer process able keyword representation of the digital signal. Thus, typing and spelling errors of the user may be corrected and a simple handling is possible by using speech entry which is automatically translated by automatic speech recognition (ASR) into a computer process able keyword representation.

According to a further embodiment of the invention, the system may comprise keyword enriching means adapted to generate one or more alternative keywords related to the computer process able keyword representation. This allows increasing the number of keywords and, thus, the input to the atmosphere elements finder. For example, for a keyword "sun" synonyms related to characteristics like "hot", "bright", "day" and synonymy related to activities like "holidays", "beach" may be generated as alternative keywords. This allows not only increasing the number of keywords, but also the kind of keyword which may result in a larger search result of atmosphere elements which may be found by the atmosphere elements finder. In an embodiment of the invention, the keyword enriching means may be adapted to generate alternative keywords by using a database of synonyms, a language model or mind mapping technology, and/or a domain specific model that maps related atmosphere-related terms to each other.

According to a further embodiment of the invention, the keyword interpreter may be adapted
- to receive a feedback signal from the atmosphere elements finder containing information about found atmosphere elements,
- to determine whether a keyword enrichment is required based on the received feedback signal,
- to send the computer process able keyword representation to the keyword enriching means for keyword enrichment, to receive one or more alternative keywords related to the computer process able keyword representation from the keyword enriching means, and to send the one or more received alternative keywords to the atmosphere elements finder to find atmosphere elements related to the one or more received alternative keywords.

The atmosphere elements finder may be adapted according to several embodiments of the invention as follows: in a first embodiment, the atmosphere elements finder may be adapted to search through a knowledge base using the computer process able keyword representation, wherein the knowledge base is adapted to map keywords to certain atmosphere properties. According to a second embodiment, the atmosphere elements finder may be adapted to use semantic web technology enabling a web crawler to find relations between the computer process able keyword representation and certain atmosphere properties. In a third embodiment, the atmosphere elements finder may be adapted to find sounds, music and atmospheric sounds related to the computer process able keyword representation as certain atmosphere properties.

In a fourth embodiment, the atmosphere elements finder may adapted to search for images, for example using a search engine for images, using the computer process able keyword representation and to analyze found images in order to find properties which can be mapped to certain atmosphere properties. In a further embodiment of the invention, the atmosphere elements finder may be adapted to analyze found images in that specific characteristics of the images are extracted and mapped to certain atmosphere properties. According to an embodiment of the invention, the atmosphere elements finder may be adapted to extract specific characteristics of the images by performing the following steps:

segmenting an image in foreground and background by detecting which objects in an image are in front and what part of the image is part of the background, detecting where the horizon is in the background of the image and dividing the background into an upper and a bottom area depending on the detected horizon, determining color characteristics in each area determined in the previous steps, and mapping the determined color characteristics of each area to certain atmosphere properties.

The invention relates according to a further embodiment to a control device for automatically creating an atmosphere, particularly for application in a system of the invention and as described above, comprising receiver means adapted to receive digital image data, image characteristics extraction means adapted to extract characteristics of digital image data received from the receiver means, and atmosphere control signal generation means adapted to generate signals for automatically creating the atmosphere depending on the extracted characteristics.

According to a further embodiment of the invention, the image characteristics extraction means are adapted to perform the following steps:

segmenting an image represented by received digital image data in foreground and background by detecting which objects in the image are in front and what part of the image is part of the background, detecting where the horizon is in the background of the image and dividing the background into an upper and a bottom area depending on the detected horizon, determining color characteristics in each area determined in the previous steps, and mapping the determined color characteristics of each area to certain atmosphere properties.

The receiver means may comprise a color scanning device according to an embodiment of the invention. With the color scanning device, color images may be transformed in digital image data for further processing by the control device.

The invention relates according to a further embodiment to an image display device, which comprises image capturing means adapted for capturing an image, which is displayed by the display device, upon receiving an image capturing signal, receiver means adapted for receiving the image capturing signal, and sender means adapted for sending a captured image as digital image data to a control device of the invention and described before.

The image display device may be for example a TV, such as a LCD or Plasma panel TV, or a digital picture frame. This image display device may act according to the invention as a sender, while the control device according to the invention may act as a receiver for signals from the image display device. Thus, it is possible to easily control the automatic creation of an atmosphere with an atmosphere creation system by simply initiating a image capturing signal when the image display device shows a picture which a user would like to use as a basis for the automatic atmosphere creation.

According to an embodiment of the invention, the control device may be integrated in the image display device. For example, a TV or a digital picture frame may comprise an electronic circuitry embodying the control device such as a microcontroller comprising a computer program implementing the functionality of the control device.

The image display device may comprise a button adapted for generating the image capturing signal upon pressing the button. For example, the button may be implemented in a TV such as an ambience control button. By pressing the ambience control button at the TV, a user may capture a picture displayed at the time of pressing the button and use this picture for the automatic creation of an atmosphere.

In a further embodiment of the invention, the image display device may comprise an interface for communicating with a system of the invention. The interface may be for example a wired or wireless communication interface such as a LAN (Local Area Network), USB (Universal Serial Bus), IEEE1394 or WLAN (wireless LAN) interface for connecting with a corresponding interface of the system.

The invention also relates to a remote control for an image display device of the invention and as described before, wherein the remote control device comprises a button adapted for generating and sending out the image capturing signal upon pressing the button. For example, the remote control device may be a standard remote control for a TV or a digital picture frame comprising as further features the button and a circuitry for generating and sending out the image capturing signal. The remote control may transmit the generated image capturing signal to the TV or digital picture frame via an infrared communication connection or a wireless radio frequency transmission.

The invention further relates to a method for automatically creating an atmosphere with an atmosphere creation system, wherein the method comprises the following features:

transforming a received keyword into a digital signal representing the received keyword, translating the digital signal into a computer process able keyword representation, finding atmosphere elements related to the computer process able keyword representation by automatically processing the computer process able keyword representation, and generating a control signal for the atmosphere creation system which adjusts settings of the atmosphere creation system depending on the found atmosphere elements.

According to a further embodiment of the invention, a computer program is provided, wherein the computer program may be enabled to carry out the method according to the invention when executed by a computer.

According to an embodiment of the invention, a record carrier such as a CD-ROM, DVD, memory card, floppy disk or similar storage medium may be provided for storing a computer program according to the invention.

These and other aspects of the invention will be apparent from and elucidated with reference to the embodiment(s) described hereinafter.

The invention will be described in more detail hereinafter with reference to exemplary embodiments. However, the invention is not limited to these exemplary embodiments.

Figure 1:
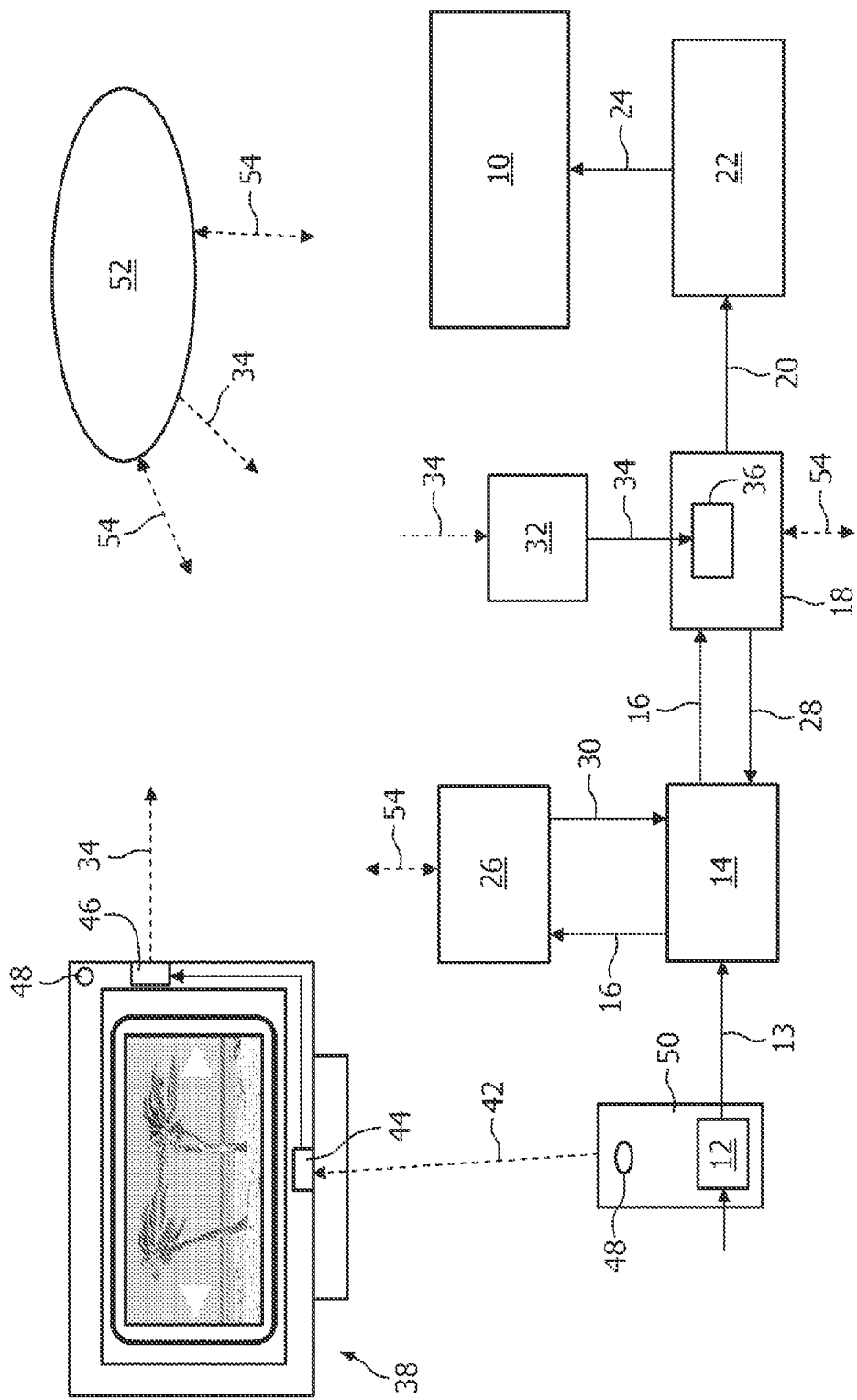
FIG. 1 shows an embodiment of a system for automatically creating an atmosphere with an atmosphere creation system according to the invention.

In the following description, the term atmosphere means any combination of sensorial perceptible stimuli such as the color and intensity of an ambient light, an ambient temperature, various scents, sounds and images. In the following description, (functional) similar or identical elements in the drawings may be denoted with the same reference numerals.

FIG. 1 shows a system, which enables a user to use a keyword to create a specific atmosphere, such as a lighting atmosphere, that matches the keyword. Such a system will allow a user to simply use a keyword in order to change the atmosphere at a particular location. For instance, a user may be able to mention:
- a specific user activity such as "read", "eat", "watch TV", "relax";
- a particular season or event such as "Christmas", "party", . . . ;
- a social context kids such as family, party;
- a geographic location or landscape such as Siberia, Tuscany, Sahara, beach, forest, sunset.

The system also allows searching for atmospheres, i.e. enables a user to find and explore numerous atmospheres in an interactive and playful way. In an implementation of the system, it comprises the keyword input receiving means 12, a keyword interpreter 14, an atmosphere elements finder 18, atmosphere creation means controller 22 keyword enriching means 26, and receiver means 32 for digital image data 34.

The keyword input receiving means 12, such as a microphone with a digital to analog converter and a keyboard, are provided to receive a spoken or typed keyword and adapted to create a digital signal 13 representing the received keyword. The keyword input receiving means 12 are integrated in a wireless remote control 50 of a TV set 38. Thus, a user has a single remote control 50 for a TV set 38 and the atmosphere creation system 10. The digital signal 13 may be transmitted via a wireless connection to the keyword interpreter 14, for example via an infrared or a radio link.

The keyword interpreter 14 receives the digital signal 13 and processes the received signal in that the represented keyword is translated into a computer process able keyword representation 16. The keyword interpreter 14 is preferably implemented as a computer program executed by a computer. The keyword interpreter 14 is able to check and correct the spelling of the keyword for text entry systems, and contains an Automatic Speech Recognition module for spoken keywords. It will also determine whether keyword enrichment is needed, based on a feedback signal 28 from the atmosphere elements finder 18. For instance, if no atmosphere properties or elements are found for a particular keyword, the keyword interpreter 14 sends the keyword 16 to the keyword enriching means 26.

Figure 2:
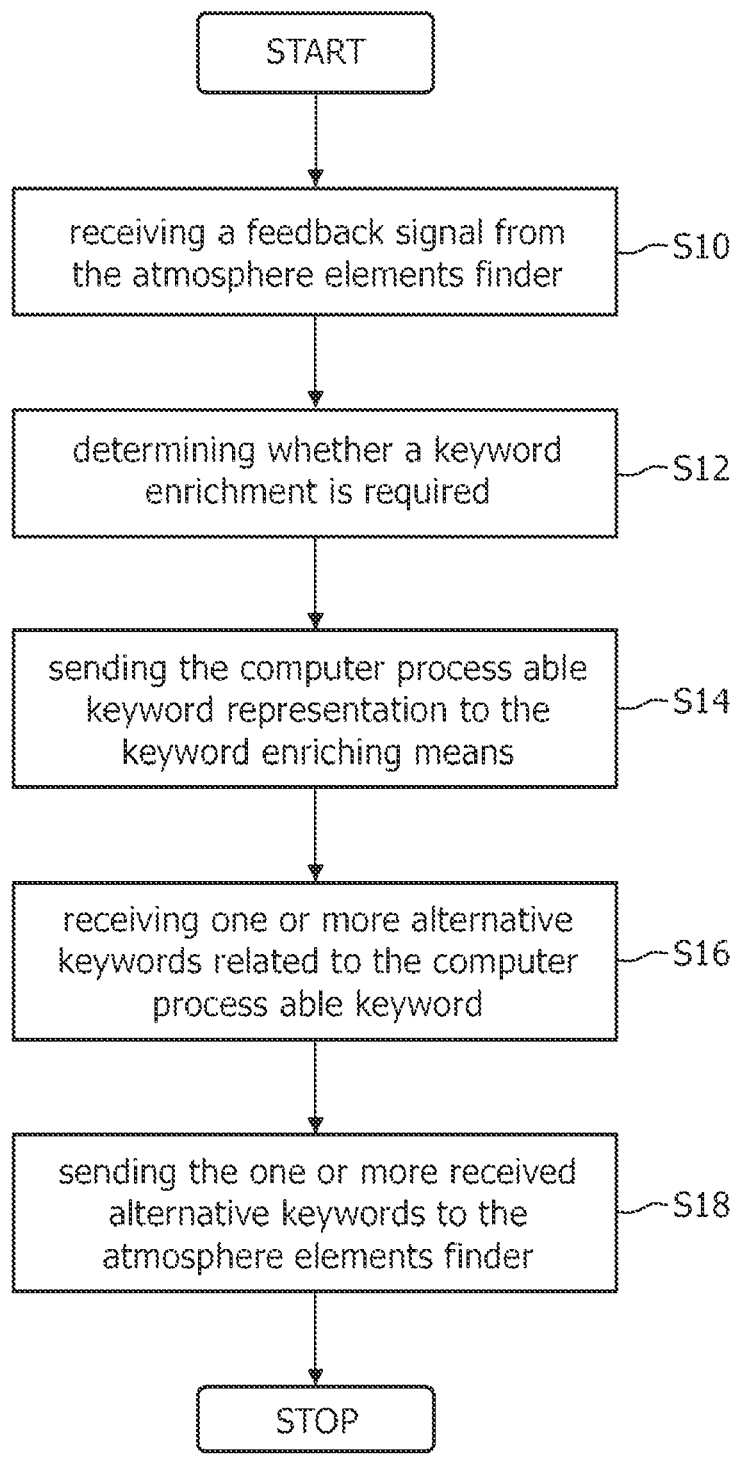
FIG. 2 shows a flowchart of a process for keyword enrichment performed by the keyword interpreter of the system of FIG. 1.

The process for keyword enrichment, performed by the keyword interpreter 14, is shown in FIG. 2. In step S10, the keyword interpreter 14 receives the feedback signal 28 from the atmosphere elements finder 18 containing information about found atmosphere elements 20. Then, in step S12, the keyword interpreter 14 determines whether a keyword enrichment is required based on the received feedback signal 28. For example, when the feedback signal 28 indicates that not enough atmosphere elements were found for creating a desired atmosphere, the keyword interpreter 14 may decide that keyword enrichment is required. In the following step S14, the keyword interpreter 14 sends the computer process able keyword representation 16 to the keyword enriching means 26 for keyword enrichment. In the following step S16, the keyword interpreter 14 receives one or more alternative keywords related to the computer process able keyword representation 16 from the keyword enriching means 26. In the last step S18, the keyword interpreter 14 sends the one or more received alternative keywords to the atmosphere elements finder 18 to find atmosphere elements 20 related to the one or more received alternative keywords.

The keyword enriching means 26 is a subsystem which, based on a given keyword 16, is able to generate one or more alternative, related keywords. This can be done in various ways. For instance, it may use a database of synonyms (Thesaurus), a language model or mind mapping technology, or a domain specific model that maps related atmosphere-related terms to each other. For instance, the keyword "snow" may yield related words such as white, winter, ice etc. The keyword enriching means 26 are preferably implemented as a computer program executed by a computer and may have access to the internet 52 via an internet connection 54. "Internet" used herein preferably means the World Wide Web (WWW), but may also be any other type of computer network such as an intranet.

The atmosphere elements finder 18 uses the textual keyword(s), i.e. the computer process able keyword(s) 16 it receives from the keyword interpreter 14 in order to find atmosphere elements 20 that match the keyword(s). These elements 20 can be either properties of the desired atmosphere, for example of a desired lighting atmosphere (such as the color, brightness, dynamics, prominence etc) or content parts that can be downloaded to be rendered by the atmosphere creation system (such as digital images, music or sounds). The atmosphere elements finder 18 is preferably implemented as a computer program executed by a computer and may have access to the internet 52 via an internet connection 54.

Finding the atmosphere elements can be done in various ways:

The keyword(s) can be used to search a (predefined) knowledge base, for example accessible via the internet 52, which is able to map keywords to certain atmosphere properties.

The keyword(s) can be used to search for images (e.g. using a search engine for images, for example accessible in the internet 52), and analyze the images in order to find (common) properties in the image, such as the color and brightness of prominent image segments, the image properties being mapped to the settings of the lighting system in such a way that an atmosphere is created that matches the style and "mood" of the image(s).

It is also possible to use semantic web technology, which enables a web crawler to find relations between a particular keyword and particular colors via the internet 52. For instance, it may find that that the term "forest" is often found on web documents that also contain the color name "green", or on web documents which contain images that have green as a prominent color.

The keyword(s) can be used to find sounds or so-called "soundscapes" (atmospheric sounds) in local databases or on the web The atmosphere elements finder 18 comprises image characteristics extraction means 36 which are adapted to extract the characteristics of received digital image data 34. The functionality of the means 36 will be described later in more detail. Furthermore, the atmosphere elements finder 18 may have also an access to the internet 52 via the internet connection 54 and may receive digital image data 34 via the internet 52 or from receiver means 32 adapted to receive digital image data 34.

The atmosphere creation means controller 22 is provided to control the atmosphere creation system 10 and is adapted to create generate a control signal 24 for the atmosphere creation system 10. The control signal 24 adjusts settings of the atmosphere creation system 10 depending on the atmosphere elements 20 found by the atmosphere elements finder 18 and transmitted to the atmosphere creation means controller 22. The atmosphere creation 10 system can be an integration of various subsystems such as, for instance, a lighting system, a smell generation system, an electronic display rendering system and an audio system. This atmosphere creation system can be applied in various domains to fulfill the need for easy atmosphere creation such as the living room, bedroom, bathroom, high-end shops, hotel rooms et cetera.

Figure 4A:
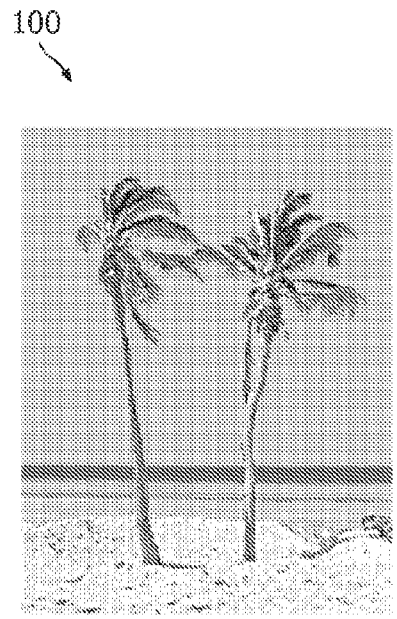
FIG. 4A to 4C shows the processing of a picture in a system according to an embodiment of the invention.

The invention is also concerned with an interaction mechanism to control an atmosphere creation system such as a lighting system. More specifically, the invention discloses a solution for users to select an image to control an atmosphere creation system, as will be described now. A selected picture may be analyzed automatically such that specific characteristics can be extracted by the image characteristics extraction means 36 of the atmosphere elements finder 18. These characteristics are then mapped onto dimension of atmospheres of the atmosphere creation systems, for example onto dimensions of the lights in a lighting system so that the proper ambience can be realized by this lighting system. People often associate pictures or images with certain ambiences. Thus, the invention offers the user the possibility to use pictures to set an ambience. The user can select a picture 100 (FIG. 4A) from a stored set of pictures, but the user could also insert a new image, for instance from a digital camera.

Figure 3:
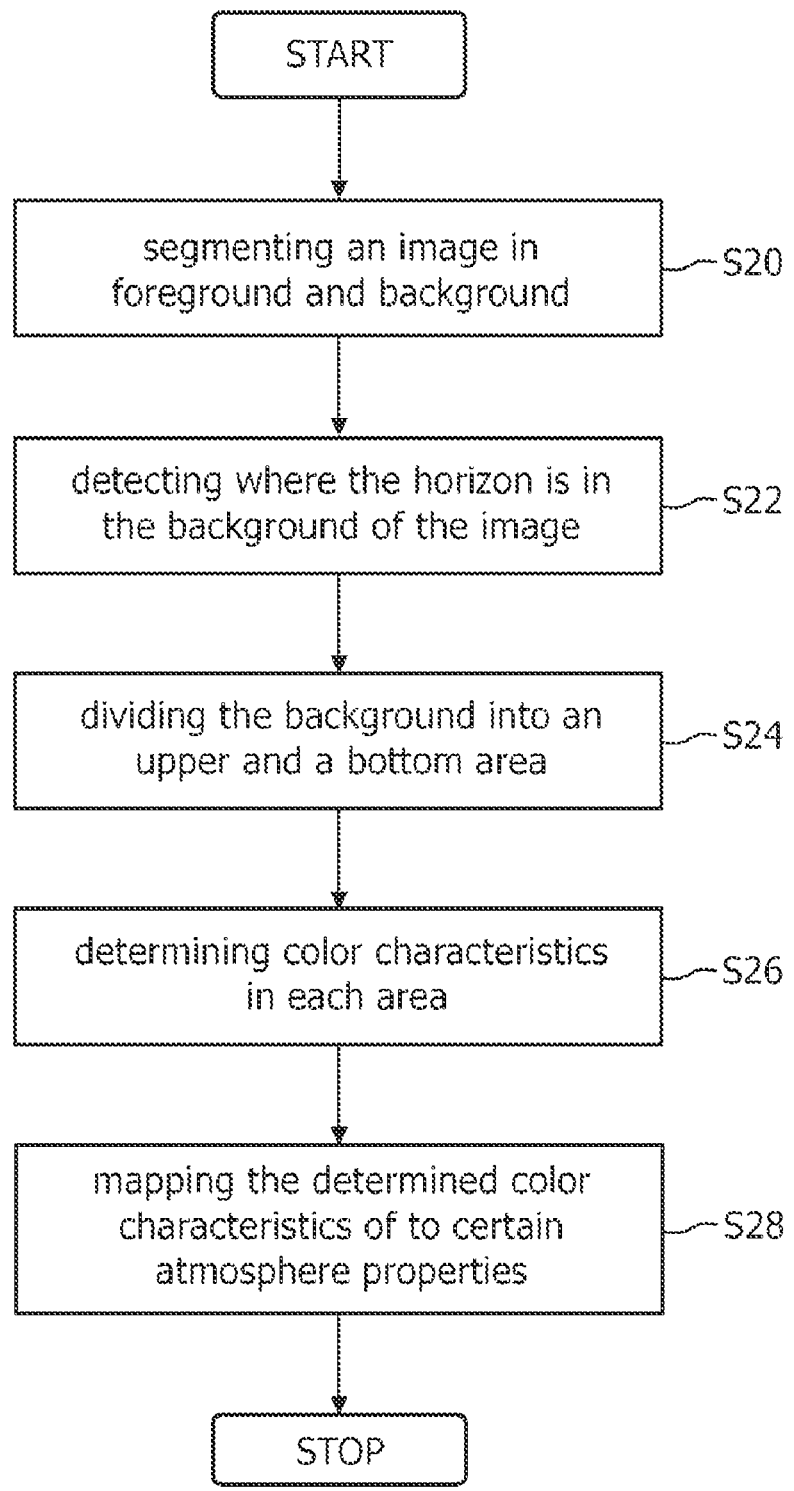
FIG. 3 shows a flowchart of a process for extracting specific characteristics of an image performed by the extraction means of the atmosphere elements finder of FIG. 1.
Figure 4B:
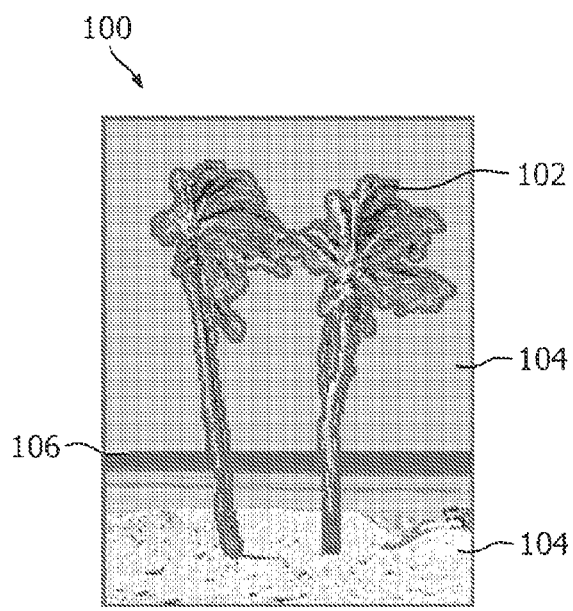
Figure 4C:
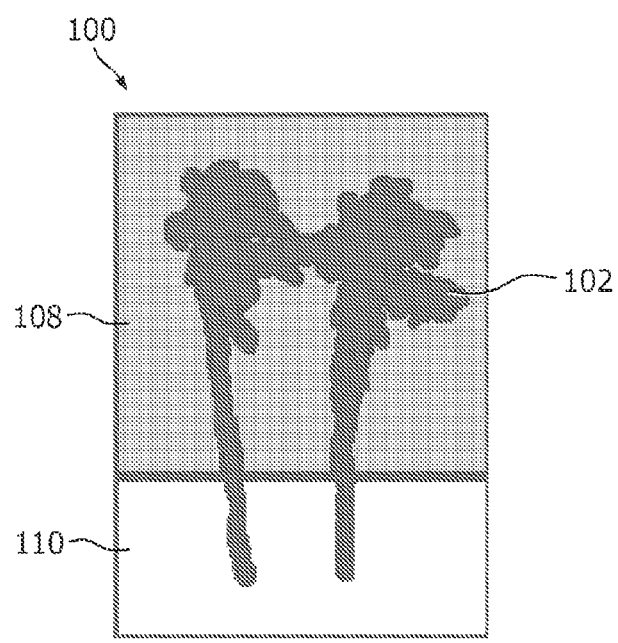

The image characteristics extraction means 36 receive digital image data 34 of the selected picture 100 and analyses the selected picture 100 in a specific manner, such that the image can be used as a basis to realize a certain atmosphere, for example a specific light ambience. In light ambiences it is important to know what colors to use in the general background lighting and more specifically often a kind of horizon is created: the upper part of a room is lit differently than the lower part of a room. In addition accent lighting is added to create more depth in the ambience. Therefore foreground and background areas 102 and 104, respectively, are determined in the selected image 100 that are analyzed so to find characteristics to map to the lighting system, refer FIGS. 4B and 4C. This is done with an automatic process, the flowchart of which is shown in FIG. 3, performed by the image characteristics extraction means 36. The process comprises the following essential steps:

Step S20: Foreground/Background Segmentation

The system detects what objects 102 are in front and what part of the picture is part of the background 104. This technology may use for instance, size of areas and the sharpness of areas in the picture 100. This step results in the definition of the area that is foreground 102 (or in focus) and of the area of the image that is background 104. It could also be that there is no foreground detected.

Step 22 and 24: Horizon Detection and Dividing the Background

The system determines where the horizon 106 is in the background 104. Subsequently the background 104 is divided into an upper area 108 and a bottom area 110. It could also be that no horizon is detected. In that case the background remains as one single area.

Step 26: Color analysis

Each area 102, 108, 110 that has been determined in the previous two steps is analyzed separately. In the areas the hue, brightness and saturation is determined. This can be based on average values or dominant values.

Step 28: Mapping

The determined characteristics of the areas 102, 108, 110 are mapped into the lights in the lighting system. The upper part 108 of the background in the image is mapped to general lighting that light the upper part of the room. For this purpose, wall-washers or cove-lights could be used. The colors in this area in the image are translated using color conversion matrices to the colors of the lamps used. The lower part 110 of the background in the image is mapped to general lighting that light the lower part of the room. For this purpose, wall-washers or cove-lights could be used. The colors in this area in the image may be translated using color conversion matrices to the colors of the lamps used for lighting the lower part of the room. If no horizon is detected, all general lighting will have the same color and brightness. Finally the foreground 102 in the image 100 is mapped to accent lighting in the room. For this purpose, spotlights or light objects may be used. The colors in the foreground area 108, 110 in the image 100 may be also translated using color conversion matrices to the colors of the lamps used as accent lighting.

The digital image data 34 may be generated and received from the system via various ways. Particularly, the picture 100 may be selected for analysis via a user interface such as a small screen based device, like a digital picture frame, or a large screen based device, like a TV set 38. The user interface could also be as simple as a USB or video connection for a digital camera. With a USB connection, the user can select an image from the camera on the user interface that is used to select all the images for creating the ambiences (much like accessing the camera from a PC via a USB connection). The user could also add images from the camera to the stored set of images. Alternatively, the user could also select an image on the camera itself (much like watching images from a camera on a TV with a composite video connection). This digital image data 34 may be send via video connection directly to receiver means 32 for digital image data 34 of the system. Yet an alternative embodiment could be the implementation of the receiver means 32 as a color scanner, for instance integrated in a wall, or a flatbed scanner, so that users can use printed images or photos as input.

In order to obtain more user convenience, an easy interaction mechanism to control an atmosphere creation system may be provided in the system according to the invention. More specifically, according to the invention an image display device such as a TV screen or digital photo frame or any other image display screen may be used to control an atmosphere creation system such as a lighting system with a single action. The image display device comprises an 'ambience' button for immediately controlling the creation of an atmosphere or ambience, respectively. Upon pressing this button, the image, which is currently presented by the picture display device, is used to render an atmosphere or ambience, respectively, using the lighting system in a room. Such a user interface control element allows the user to easily adjust for example the lighting ambience of a light system.

In FIG. 1, the TV set 38 is provided as the picture display device. The TV set 38 comprises an 'ambience' button 48. Also, the remote control 50 of the TV set 38 comprises an 'ambience' button 48. Upon pressing the button 48 on the TV set 38, the image currently presented on the screen of the TV set 38 is transmitted by the sender means 46 as digital image data 34 to the receiver means 32 for digital image data. The receiver means 32 forward the received digital image data from the TV set 38 to the image characteristics extraction means 36 for further processing as described above with regard to FIGS. 3 and 4A to 4C. Upon pressing the button 48 on the remote control 50, an image capturing signal 42 is transmitted to receiver means 44, for example the infrared receiver means of the TV set for receiving control commands from the remote control 50. The receiver means 44 initiate a capturing of the currently picture displayed on the screen of the TV set 38 and signal to the sender means 46 to transmit the digital image data 34 of the captured picture.

It should be noted that the analysis of the captured picture as described with regard to FIG. 3 may be also performed locally in the TV set 38. Therefore, the TV set 38 may comprise for example the image characteristics extraction means 36 of the atmosphere elements finder 18 or may be adapted to perform an image characteristics extraction process as shown in FIG. 3. Incidentally, any kind of digital picture device may comprise the functionality of extracting the characteristics of a displayed and captured picture such as a digital photo frame, a digital photo camera or a Personal Computer displaying pictures and executing a program performing the image characteristics extraction functionality. Also, these picture display devices may comprise the sender means 46 for either transmitting digital image data 34 or the results of an image characteristics extraction.

The link between the picture display device and the atmosphere creation system could be a fixed connection, in the sense that the selected image would influence an entire lighting system (for instance a room). On the other hand, the link between the picture display device and atmosphere creation system could be more flexible, in the sense that the selected image would only influence the direct surrounding of the picture display device, for example the ambience of the TV set 38. The actual data connection between picture display device could both be wired and wireless.

At least some of the functionality of the invention such as the functionality of the keyword interpreter 14, the keyword enriching means 26, the atmosphere elements finder 18, image characteristics extraction means 36, and the atmosphere creation means controller 22 may be performed by hard- or software. In case of an implementation in software, a single or multiple standard microprocessors or microcontrollers configuration may be used. The invention might be implemented by single or multiple algorithms.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:

1. A system for automatically creating an atmosphere with an atmosphere creation system comprising
    keyword input receiving means configured to transform a keyword into a digital signal;
    a keyword interpreter configured to translate the digital signal into a computer-processable keyword representation;
    keyword-enriching means configured to generate one or more alternative keywords related to the computer-processable keyword representation;
    an atmosphere elements finder configured to find atmosphere elements related to the keyword by automatically processing the computer-processable keyword representation; and
    an atmosphere creation controller configured to generate a control signal for the atmosphere creation system, which adjusts settings of the atmosphere creation system depending on the found atmosphere elements, wherein the keyword interpreter further configured to:
    determine whether a keyword enrichment is required based on a feedback signal from the atmosphere elements finder,
    send the computer-processable keyword representation to the keyword-enriching means,
    receive the alternative keywords from the keyword-enriching means, and
    send the alternative keywords to the atmosphere elements finder.

2. The system of claim 1, wherein the keyword input receiving means comprise a keyboard and a microphone for the entry of a keyword and an analog-to-digital converter for generating the digital signal from a microphone signal.

3. The system of claim 2, wherein the keyword interpreter is configured to check and correct the spelling of a keyword inputted via the keyboard and comprises an automatic speech recognition module for translating a spoken keyword into the computer-processable keyword representation.

4. The system of claim 1, wherein the keyword enriching means are configured to generate alternative keywords by using a database of synonyms, a language model or mind mapping technology, and/or a domain specific model that maps related atmosphere-related terms to each other.

5. The system of claim 1, wherein the atmosphere elements finder is configured to search through a knowledge database arranged to map keywords to certain atmosphere properties.

6. The system of claim 1, wherein the atmosphere elements finder is configured to use semantic web technology enabling to find relations between the keyword and certain atmosphere properties.

7. A system for automatically creating an atmosphere with an atmosphere creation system, comprising
    keyword input receiving means configured to transform a keyword into a digital signal;
    a keyword interpreter configured to translate the digital signal into a computer-processable keyword representation;

an atmosphere elements finder configured to find atmosphere elements related to the keyword by automatically processing the computer-processable keyword representation; and an atmosphere creation controller configured to generate a control signal for the atmosphere creation system, which adjusts settings of the atmosphere creation system depending on the found atmosphere elements, wherein the atmosphere elements finder is configured to:

find sounds, music and atmospheric sounds related to the computer-processable keyword representation as certain atmosphere properties;

search for images using the computer-processable keyword representation; and analyze found images in order to find properties attributable to certain atmosphere properties by segmenting an image for foreground and background areas by detecting which objects in the image are in front and what part of the image is part of the background, detecting where the horizon is in the background area of the image and dividing the background area into upper and bottom areas depending on the detected horizon, determining color characteristics in each of the areas, and mapping the determined color characteristics of each of the areas to certain atmosphere properties.

* * * * *